United States Patent [19]

Dobbs

[11] Patent Number: 4,649,799
[45] Date of Patent: Mar. 17, 1987

[54] SEALING ASSEMBLY

[76] Inventor: Herbert H. Dobbs, 880 Englewood, Rochester, Oakland, Mich. 48063

[21] Appl. No.: 660,574

[22] Filed: Oct. 12, 1984

[51] Int. Cl.$^4$ ............................................. F41F 11/04
[52] U.S. Cl. ............................................. 89/26; 89/24
[58] Field of Search ..................... 89/26, 24; 34/242

[56] References Cited

U.S. PATENT DOCUMENTS

| | | | |
|---|---|---|---|
| 167,981 | 9/1875 | Broadwell | 89/26 |
| 483,267 | 9/1892 | Seabury | 89/26 |
| 983,781 | 2/1911 | Smith | 89/26 |
| 1,062,646 | 5/1913 | Gerdom | 89/26 |
| 1,376,130 | 4/1921 | Asbury | 89/26 |
| 2,998,755 | 9/1961 | Thierry | 89/26 |
| 3,006,254 | 10/1961 | Thierry | 89/26 |
| 3,125,928 | 3/1964 | Bartels | 89/26 |
| 3,434,381 | 3/1969 | Thierry | 89/26 |
| 3,572,729 | 3/1971 | Hodil | 89/26 |
| 3,738,223 | 6/1973 | Post et al. | 89/26 |
| 3,738,224 | 6/1973 | Post et al. | 89/26 |
| 4,309,167 | 1/1982 | Kurz et al. | 34/242 |

Primary Examiner—Stephen C. Bentley
Assistant Examiner—Stephen Johnson
Attorney, Agent, or Firm—Peter A. Taucher; Gail S. Soderling

[57] ABSTRACT

An improved sealing system for use in a sliding seal. The seal has a sliding member with first and second L-shaped seals and an annular opening. One L-shaped seal serves to seal junction of the annular opening with the sliding member and the second seal serves to seal the sliding member to the bore.

1 Claim, 3 Drawing Figures

SEALING ASSEMBLY

GOVERNMENT INTEREST

The invention described herein may be manufactured, used, and licensed by or for the Government for governmental purposes without payment to me of any royalty thereon.

BACKGROUND OF THE INVENTION

In one aspect this invention relates to sealing assemblies. In a further aspect, this invention relates to breach loading ordinance.

Sliding breech block guns or cannons are well known in the art. Two examples of prior art systems are shown in U.S. Pat. Nos. 2,469,400 and 4,348,937.

Sliding breech block systems have to be sealed so as to contain combustion gases generated when the gun is fired. It has been proposed to use an L-shaped seal which fits in a corresponding groove in the face of the breech block. Such a structure would properly seal the gun at the firing pressures which generally exceed 60,000 psi. However, the useful life of such breech blocks have proved to be lower than desired. The most common problem with the breech blocks has been the formation and popagation of fatigue cracks at the grooves formed in the breech block to hold the L-seal.

It would be desirable to provide a sliding breech block construction where there is no stress raiser configuration in the design. It is also desirable to have a construction which does not substantially change the internal volume of the guns breech to avoid design changes in the charges or the gun's performance characteristics.

SUMMARY OF THE INVENTION

A breech block sealing assembly having the desired characteristics has a base section formed with a flat surface and adapted to slide between a bore sealing position and a bore exposed position which allows loading of the gun. An annular face plate is adapted to mate with the base section to form a cylindrical bore. A first L-shaped seal is disposed within the face plate annulus having one leg in contact with the face of the base section and the second leg extending longitudinally away from the face plate in contact with the annular wall. A second L-shaped seal is disposed within the cylindrical bore with its lateral edge in contact with the annular wall and the radially extending leg located near the opening of the cylindrical bore.

DETAILED DESCRIPTION OF PREFERRED EMBODIMENTS

Figure 1:
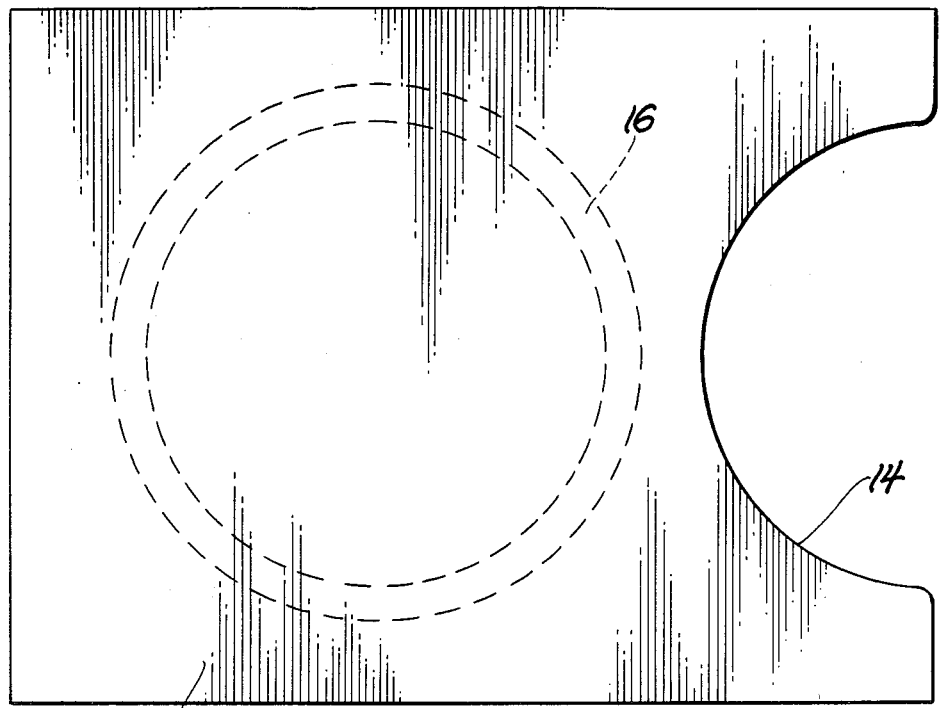
FIG. 1 is an end view schematic of a sliding breech block.

Referring to the accompanying drawing and initially to FIG. 1, a sliding breech block 10 is shown as an outline without detail. The breech block 10 has a base section 12 formed with a semi-circular cut out 14. When the solid sliding breech block is moved into the bore exposed position, the semi-circular cut out 14 allows shell casings to be extracted and a new round inserted into the bore. The breech block has a face plate 16 formed as a block matching block 12 with a hole formed therein (shown in phantom in FIG. 1) in contact with the base section. The ancillary structure necessary to move and lock the breech block is not shown such structures being known in the art.

Figure 2:
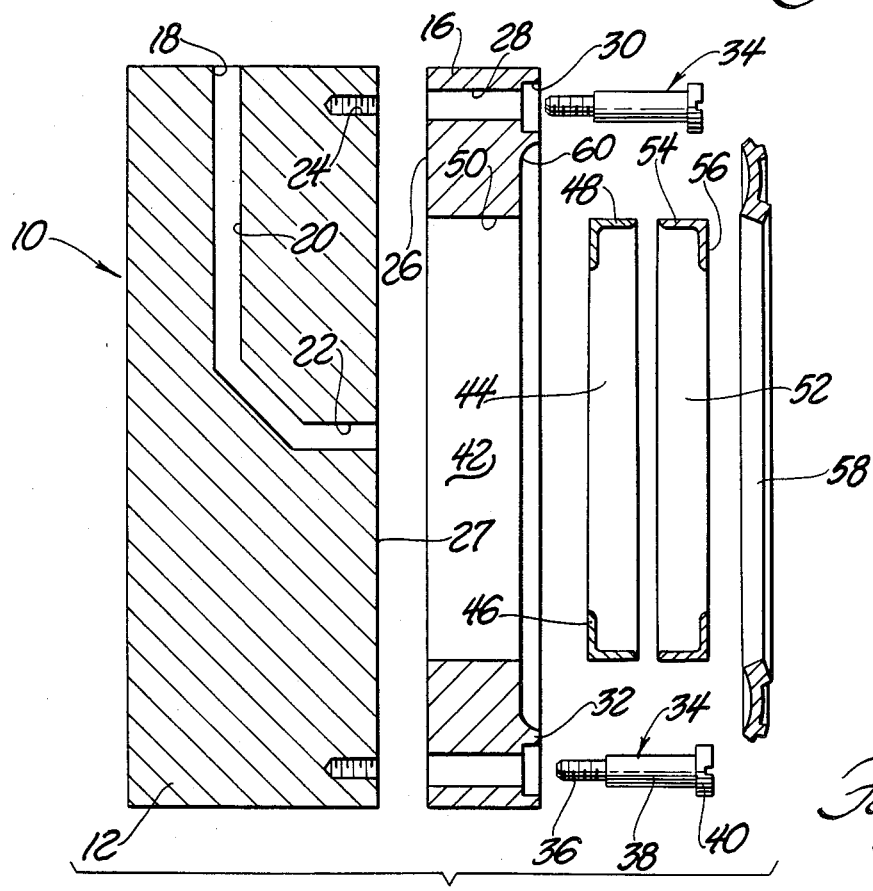
FIG. 2 is a side view in section of one embodiment of this invention.
Figure 3:
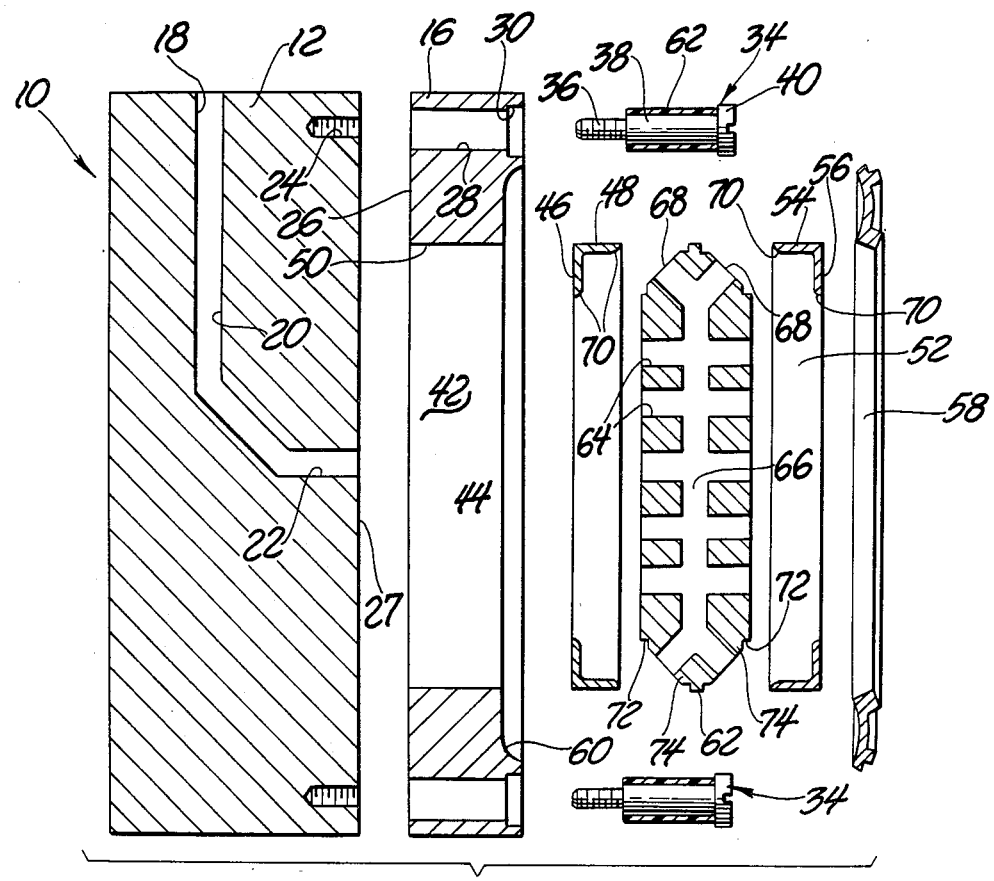
FIG. 3 is a side view in section of a second embodiment of this invention.

Two versions of a sliding breech block constructed according to this invention are shown in greater detail in FIGS. 2 and 3. Referring to FIG. 2, the base section 12 of the sliding breech block assembly 10 is formed with an ignition bore 18 which has a radially extending portion 20 and makes a ninety degree turn to exit from the base section 12 at an ignition hole 22. The ignition hole 22 is located to provide an ignition flame to detonate a charge sealed in the bore (not shown) by the breech block assembly 10. The base section 12 has a plurality of circumferentially spaced threaded apertures 24 formed in the base section.

An annular face plate 16 has a first planar surface or face 26 which is adapted to mate with a corresponding face 27 on the base section 12. A plurality of complementary recessed apertures 28 having an enlarged head engaging recess 30 are formed in the second face 32 of the annular face plate 16. The recessed apertures 28 are disposed near the circumference of the annular face plate 16 in a configuration which corresponds to the pattern of the threaded apertures in the base section.

A plurality of threaded fasteners are disposed in the recessed apertures 28 to bind the face plate 16 to the solid base block 12. The threaded fasteners 34 have a threaded portion 36 adapted to engage threaded apertures 24, a shank portion 38 which extends through the major portion of recessed apertures 28 and a head 40 which is disposed in the recesses 30. In general, it is desirable to form the heads 40 sufficiently smaller than the recesses 30 so that the annular face plate 16 can expand radially under the hoop stresses applied when operating pressure is applied without having the annular face plate exert shear stress on the fastener's head. As shown, the heads of the fasteners have a slot for use in tightening the fasteners but other drive accepting configurations could also be used.

When the fasteners are inserted and tightened the base section and face plate 16 form a cavity 42 with its open face opening into the gun's bore. The cavity 42 contains two L-shaped circular seals adapted to seal combustion gases formed when the gun is fired. The first circular seal 44 has a radially extending leg 46 which contacts the face 27 of the base section and a second longitudinal leg 48 which contacts the interior wall 50 of the annular face plate 16. The pressure caused by gases during firing of the gun will force the first seal's legs firmly into contact with the base section and annular face plate to form a gas tight seal.

A second L-shaped seal 52 is also disposed within the cavity with its longitudinally extending leg 54 lying along the wall 50 of the annular face plate 16. The radially extending leg 56 of the second L-shaped seal 52 is located at the bore side of the annular face plate. When the breech is closed, the radially extending leg 56 of the second L-shaped seal 52 will seal against the breech face to provide a gas tight seal between the breech face and the annular face plate 16.

A bore wiper 58 is located in an annular depression 60, formed on the bore surface of the annular face plate 16. The bore wiper is formed from metal and will clean the residue on the surface of the gun bore as the breech block is moved between the loading and firing positions.

FIG. 3 shows a modified embodiment of FIG. 2. In FIG. 3, the threaded fasteners 34 are fitted with elastomeric sleeves 62 covering their shanks 38. The elastomeric sleeves would tend to center the threaded fasteners 34 within the recessed apertures 28 and when properly dimensioned, would allow the annular face plate 16 to expand radially when the gun is fired without the annular face plate exerting a shear force on the threaded fastener shank 38. This provides easier assembly and longer life for the breech seal.

FIG. 3 also has a filler plate 62 located between the L-shaped seals 44 and 52. The filler plate 62 has a plurality of ignitor bores 64 which extend parallel to the bore of the gun to allow the ignition flame as it exits bore 22 to contact the charge (not shown). Another diffusion bore 66 extends radially through the filler plate 62 to allow a quantity of gas formed by the charge to travel to the periphery of the filler plate 62. At the radially outward ends of the bore 66, the gas will exit from ports 68 which will direct a portion of the exhaust gases against the L-shaped seals 44, 52 to expand the seals to the gas sealing condition. The filler plate is shaped at its periphery so the rounded tips 70 on legs 46, 48, 54 and 56 of the L-shaped seals engage a complimentary rounded depressions 72 in the filler 62. The L-shaped seals 44, 52 in combination with the surfaces 74 form triangular cross-section plenums to receive the gas from the ports 68 and expand the seals.

The filler plate is desirable since it substantially fills the cavity 42 and therefore this system will not change the gun cavity. If a filler plate is not used, then the gun must be adjusted accordingly.

When a gun using the seal of this invention is fired, the gas pressure will subject the annular face plate 16 to hoop stresses while the base block 2 is subject only to pressure on the face of the block parallel to the guns bore.

From the foregoing, it is apparent that an improved seal for a sliding breech block system has been disclosed.

I wish it to be understood that I do not desire to be limited to the exact details of construction shown and described for obvious modifications will occur to a person skilled in the art, without departing from the spirit and scope of the appended claims.

What is claimed is:

1. A sealing system for use with a sliding breech block, large bore gun comprising sliding seal member formed with a substantially planar surface and mounted for movement longitudinally from a bore sealing position for firing to a bore exposed position to allow loading of the gun at the breech position, said sliding seal member having an ignition bore formed therein, and a plurality of spaced internally threaded apertures formed in the sliding seal member annular face plate having a first planar surface in contact with the substantially planar face on the base sliding seal member, and a second face having an annular depression formed therein, the annular face plate having a plurality of apertures disposed near the periphery of the annular face plate the apertures being in a one to one correspondence with the internally threaded apertures formed in the sliding seal member, each of said apertures having an enlarged recess formed coaxially with the aperture; plurality of enlarged head threaded fasteners located in the apertures of the annular face plate the fasteners located in the apertures in the sliding seal member to firmly hold the annular face plate and sliding seal member together, the enlarged head of the fasteners being disposed within the recesses in the annular plate there being sufficient clearance between the enlarged heads and the recesses to allow radial expansion of the annular face plate upon the imposition of hoop stresses; a plurality of elastomeric sleeves surrounding the shank portion of the threaded fasteners between the fasteners and the apertures in the annular plate; a first circular L-shaped seal having a radially extending leg in contact with the substantially planar surface of the sliding seal member and a second leg extending longitudinally away from the substantially planar surface of the sliding seal member and in contact with the inner wall of the annular opening of the annular face plate; a second circular L-shaped seal having a longitudinally extending leg in contact with the inner wall of the annular face plate, the longitudinally extending leg of the second circular L-shaped seal having its free end near the free end of the longitudinally extending leg of the first L-shaped seal, and a radially extending leg which is located near the side of the annular opening away from the planar surface of the sliding seal member; filler plate located between the first and second circular L-shaped seals, said filler plate having a plurality of openings extending therethrough, said openings extending parallel to the longitudinal axis of the gun, and a plurality of ports pointing outward from the periphery of the filler plate towards the first and second L-shaped seals; and a shaped bore wiper disposed within the annular depression formed in the surface of the circular face plate.

* * * * *